3,337,523
BASIC MONOAZO AND DISAZO DYESTUFFS
CONTAINING A HYDRAZINIUM GROUP
Roland Entschel and Curt Mueller, Basel, and Walter
Wehrli, Riehen, Switzerland, assignors to Sandoz Ltd.
(also known as Sandoz A.G.), Basel, Switzerland
No Drawing. Filed Apr. 29, 1966, Ser. No. 546,194
Claims priority, application Switzerland, Apr. 21, 1961,
4,709/61; Jan. 12, 1962, 359/62; Apr. 24, 1962,
4,898/62; May 3, 1963, 5,588/63; Jan. 16, 1964,
479/64; Feb. 7, 1964, 1,482/64
6 Claims. (Cl. 260—165)

The present invention is a continuation-in-part application to our copending applications Ser. No. 188,837, filed on Apr. 19, 1962, and now U.S. Patent 3,252,967; Ser. No. 188,889, filed on Apr. 19, 1962, and now U.S. Patent 3,252,965; Ser. No. 250, 787, filed on Jan. 11, 1963, now abandoned; Ser. No. 250,788, filed on Jan. 11, 1963, now abandoned; Ser. No. 250,789, filed on Jan. 11, 1963, now abandoned; our continuation-in-part application, Ser. No. 300,068, filed on Aug. 5, 1963, now abandoned; our continuation-in-part application, Ser. No. 306,306, filed on Sept. 3, 1963; our continuation-in-part application Ser. No. 306,321, filed on Sept. 3, 1963, and now abandoned; our continuation-in-part application, Ser. No. 344,557, filed on Feb. 13, 1964, and now abandoned, and relates to basic dyestuffs and process for the production.

This invention relates to basic dyestuffs of the formula

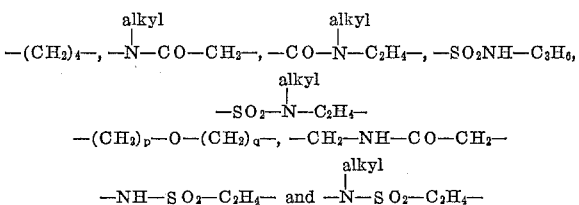

(I)

wherein
A is a member selected from the group consisting of a radical of a monoazo and a disazo dyestuff, said dyestuffs being free from carboxylic acid and sulfonic acid groups.
y is a bridge member selected from the group consisting of

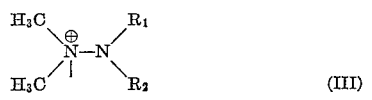

wherein
 p and q each stands for a positive integer of up to 6 and alkyl being lower alkyl in each occurrence thereof,
$R_1$ and $R_2$ each is a member selected from the group consisting of hydrogen and methyl.
n is a positive integer of up to 2,
m is a positive integer of up to 2, and when n is 2, m is 2, and
$X^\ominus$ is an anion.

These new dyes of Formula I can conveniently be prepared by replacing, or converting, n substituents Z in a compound of the formula $$B\text{-}(y\text{—}Z)_n \qquad \text{(II)}$$

by, or into, n groups of the formula

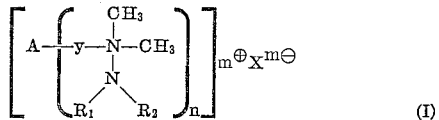

(III)

wherein B represents A or the radical of a compound capable of the formation of a monoazo or a disazo dye A, and Z a substituent which can be replaced by, or converted into a group of Formula III; upon which the reaction product is converted by a coupling or a condensation reaction into a dye in cases where B represents the radical of a compound capable of the formation of a monoazo or a disazo dye.

A preferred mode of operation of the present process for the production of the new basic monoazo or disazo dyes comprises reacting 1 mol of a compound of the formula $$B\text{-}(y\text{—}E)_n \qquad \text{(IV)}$$

wherein E represents the acid radical of an ester, with n mols of a compound of the formula

(V)

and converting the reaction product into a monoazo or disazo dye, when B stands for the radical of a compound which permits the formation of a dye.

It is also possible to quaternate a compound of the formula

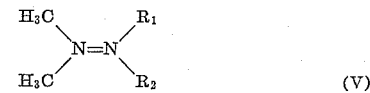

(VI)

with an agent yielding methyl groups, and to convert the reaction product into a monoazo or a disazo dye when B represents the radical of a compound which permits formation of a dye.

The new basic dyes of Formula I can be arrived at by alkylating a compound of the formula

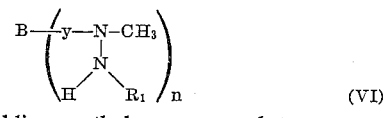

(VII)

with an agent yielding methyl groups and converting the reaction product into a monoazo or a disazo dye when B represents the radical of a compound permitting the formation of a dye, or by reacting 1 mol of an amine of the formula

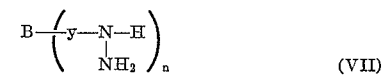

(VIII)

wherein $R_3$ represents hydrogen or the methyl group and $R_4$ hydrogen or the methyl group, with n mols of a halogen amine, quaternating the reaction product with an agent yielding methyl groups if necessary, and converting it into a monoazo or a disazo dye when B represents the radical of a compound which permits formation of a dye. Here, quaternation and conversion into a dye can be carried out in either order.

Monoazo or disazo dye radicals containing metal atoms bound by coordination links can also be used. The ortho, ortho'-dihydroxy or ortho, ortho'-hydroxyamino compounds, together with the ions of heavy metals such as Fe, Cu, Ni, Cr, Co, Mn are suitable for the formation of 1:1 and 1:2 metal-complex dyes.

The components B which are suitable for the formation of the monoazo or disazo dye radical A are preferably those which can be converted into the above-mentioned azo dye radicals by reaction with a diazonium salt or a coupling compound.

The azo coupling reaction is carried out in the known way, preferably in a weakly alkaline to acid medium which may be buffered if necessary.

Other suitable components B are compounds which contain a functional group or a group convertible into a functional group. These compounds are reacted with the components used for the formation of the monoazo or disazo dye radical A to give the final dye of Formula I e.g. by a condensation reaction. Methylating agents which are suitable for converting compounds of the Formulae VI, VII and, where necessary, VIII into the dye salts conforming to the present process are, e.g. the esters of strong mineral acids and organic sulfonic acids such as methyl chloride, methyl bromide and methyl iodide or dimethyl sulfate, methyl esters of low molecular alkansulfonic acids or of benzenesulfonic acid. The alkylation or quaternation is effected preferably in an inert solvent or, where suitable, in an aqueous suspension, or without solvent in an excess of the alkylating agent and at elevated temperature and in a medium which may be buffered if necessary.

The anion or anions X may be organic or inorganic ions, e.g. the ions of methyl-sulfate, sulfate, disulfate, perchlorate, chloride, bromide, iodide, phosphorus-molybdate, phosphorus-tungsten-molybdate, benzene-sulfonate, oxalate, maleinate, acetate, propionate, methansulfonate, chloroacetate or 4-chlorobenzene-sulfonate.

Examples of suitable acid radicals E are those of sulfuric acid ($E=SO_4H$), a sulfonic acid ($E=SO_3R$ where R is a substituted or unsubstituted hydrocarbon radical) and hydrogen sulfide ($E=SH$), but preferably the radicals of the halogen hydracids ($E=Cl$, Br etc.) are employed.

The reaction of a compound of Formula IV with a hydrazine of the Formula V is effected preferably in an organic solvent and at temperatures of $-50°$ C. to $+250°$ C. The reaction can also be carried out in aqueous medium, if necessary with the addition of an organic solvent, or without solvent at the above-stated temperatures.

The reaction of an amine of Formula VIII with a halogenamine is carried out preferably in an organic solvent and at tempertures of $-50°$ C. to $+80°$ C. The reaction can also be effected in aqueous medium if necessary with the addition of an organic solvent, at the above-stated temperatures. The halogenamine can be employed either in gaseous form or in solution in an organic solvent, in water, or in a solvent-water mixture.

The dyes formed are separated by one of the basic operations such as filtration, evaporation and filtration, precipitation from a suitable medium and filtration.

The new dyes are excellent for dyeing, padding and printing materials of polymers containing more than 80% acrylonitrile, e.g. polyacrylonitrile, e.g. Orlon (registered trademark), and copolymers containing 80–95% acrylonitrile and 20–5% vinyl-acetate, methyl acrylate or methyl methacrylate.

These products are marketed under the following names, most of which are registered trademarks: Acrilan (the copolymer of 85% acylonitrile and 15% vinyl acetate or vinyl pyridine), Orlon, Dralon, Courtelle, Crylor, Dynel, etc.

The dyeings on these materials obtained with the dyes of the process possess good fastness to light, washing, perspiration, sublimation, pleating, decatizing, pressing, water, sea water, bleaching, dry cleaning, cross dyeing and solvents. Some of the dyes are very good soluble in water.

The dyes of the present process are dyed to best advantage from aqueous medium, and it is preferable for the medium to be neutral or acid and of boiling temperature.

The commercially available retarding agents can be used in dyeing without adverse effect, though the new dyes produce perfectly level dyeings on the above-named polymers and copolymers without the addition of these agents. The dyes can be applied in closed equipment and under pressure, as they are highly stable in water to prolonged boiling. They also give very good dyeings on blend fabrics containing a polyacrylonitrile fiber or acrylonitrile copolymer fiber as one of the components. A selected number of the new dyes are suitable for dyeing polyacrylonitrile in the mass in shades fast to light and wet fastness treatments. The dyes of the present process which possess good solubility in organic solvents are suitable for the coloration of oils, paint and lacquer media, and plastics, and for the dyeing of fiber-forming materials in the spinning solution. They have many other uses, for example the dyeing of tannin-treated cotton, wool, silk, regenerated cellulose, synthetic polyamide fibers, and paper. At all stages of manufactures it has been found that mixtures of two or more dyes of Formula I can be used with good success.

The new dyes are well suited for combination, so that dye salts of the same or different dye classes can be used for producing widely different shades.

The azo dyes obtained by the present process may belong, for example, to the benzene-azo-benzene, benzene-azo-naphthalene, benzene-azo-pyrazolone, benzene-azo-acylacetic acid arylamide, benzene-azo-phenyl, benzene-azo-diphenyl, benzene-azo-benzene-azo-pehnol, thiazole-azo-benzene, thia-diazol-azo-pyrazolone, pyridine-azo-indole, benzene-azo-tetrahydroquinoline, benzthiazol-azo-tetrahydroquinoline, thiazol-azo-tetrahydroquinoline, benzene-azo-indole, benzene-azo-quinoline, benzene-azo-pyrazolidinedione, benzene-azo-indanedione, benzene-azo-pyrrole, benzene-azo-benzo-tetrahydroquinoline or quinoline-azo-benzene series etc. They can be produced by the known methods, either by coupling diazotized amines with azo components, or by oxidation coupling. The hydrazinium group can be linked to the diazo- and/or the azo component, in certain cases alongside other cationic groups, e.g. ammonium or cycloammonium groups.

Diazo compounds of the benzene, naphthalene and heterocyclic series are suitable for the production of the azo dyes of the present process. The substituents in these compounds are preferably those which are employed in the known disperse (acetate) and polyester dyes. Particularly suitable are chlorine, bromine, fluorine, nitrile, nitro, alkyl, trihalogenalkyl, alkyl-sulfonyl, sulfonamide, monoalkyl and dialkyl-sulfonamide, carbalkoxy, carboxylic acid amide, hydroxyl, alkoxy and carbalkoxy groups.

Suitable coupling components are the derivatives of the benzene, naphthalene and heterocyclic series and components having an active methylene group. Particularly suitable are the substituted aminobenzene derivatives which may be further substituted by alkyl groups and the derivatives substituted in the aromatic nucleus by e.g. substituted or unsubstituted alkyl, alkoxy, halogen, cyan, trifluoromethyl, alkanoylamino, alkyl-sulfonylamino etc. The term "alkyl radical" refers not only to radicals such as methyl, ethyl, propyl and butyl, but also to their substitution products (c.f. E. de Barry, Anthracene and Anthraquinone, London, 1921, p. 207). The substituents or substitution products which may be mentioned as examples are halogen, hydroxyl, as e.g. in the chloropropyl, hydroxyethyl and dihydroxypropyl radicals, ethers and esters, e.g. methoxyethyl and acetoxyalkyl radicals, the esters of carboxylic and sulfonic acids, e.g. in the carbalkoxyalkyl radical and the nitrile group, as e.g. in the cyanethyl radical.

In the following examples the parts and percentages are by weight and the temperatures in degrees centigrade.

EXAMPLE 1

29.8 parts of the chloride of 1-amino-2-chloro-4-N-methyl - N - [α-N',N'-dimethylhydrazinio-acetyl]-aminobenzene are dissolved in a mixture of 170 parts of water and 35 parts of 30% hydrochloric acid and diazotized at 0° with 100 parts of normal sodium nitrite solution. The clear diazo solution is added dropwise in 30 minutes to an ice-cold solution consisting of 13.2 parts of 1-hydroxy-4-methylbenzene, 200 parts of water, 40 parts of 25% aqueous ammonia solution and 10 parts of a mixture of pyridine bases. Stirring is continued at 0° until the coupling reaction is completed. The new yellow dyestuff formed is precipitated from the reaction mass by neutralization with 10% hydrochloric acid and sodium chloride, and is then filtered off, dried and ground. If necessary the dyestuff can be purified by re-crystallization, e.g. from ethyl alcohol. It is a yellow brown powder which dissolves in water with a yellow coloration and is suitable for dyeing polyacrylonitrile fibers in yellow shades of very good light and wet fastness.

EXAMPLE 2

33.8 parts of the chloride of 1-amino-2-methylsulfonyl-4-N-methyl - N - [α-N',N'-dimethylhydrazinio-acetyl]-amino-benzene are dissolved in a mixture of 170 parts of water and 35 parts of 30% hydrochloric acid and diazotized at 0° with 100 parts of normal sodium nitrite solution. The clear diazo solution is added dropwise in 30 minutes to an ice-cold solution consisting of 14 parts of 1-hydroxy-2,4-dimethylbenzene, 200 parts of water, 40 parts of 25% aqueous ammonia solution and 10 parts of a mixture of pyridine bases. Stirring is continued at 0° until the coupling reaction is completed. The new yellow dyestuff formed is precipitated from the reaction mass by neutralization with 10% hydrochloric acid and sodium chloride, and is then filtered off, dried and ground. If necessary the dyestuff can be purified by recrystallization, e.g. from ethyl alcohol. It is a yellow-brown powder which dissolves in water with a yellow coloration and is suitable for dyeing polyacrylonitrile fibers in yellow shades of very good light and wet fastness.

EXAMPLE 3

16 parts of chloroacetyl chloride are added in 20 minutes at 20° to a solution of 23.5 parts of 4-methyl-amino-benzene-aza-para-cresol in 200 parts of chloroform. After addition of 8.5 parts of sodium bicarbonate and boiling for several hours with reflux the acylation reaction is completed. After filtration the chloroform is distilled off and the residue is recrystallized from ethyl alcohol. 15 parts of the chloroacetyl derivative in a solution of 4 parts of N,N-dimethyl hydrazine and 150 parts of benzene is boiled for several hours with reflux condensation. On cooling the precipitated basic dyestuff is filtered off, dried and if necessary recrystallized. The new dyestuff dissolves in water with a yellow coloration and can be used for dyeing polyacrylonitrile fibers and containing polyacrylonitrile fibers in mixtures in yellow shades of very good light and wet fastness.

EXAMPLE 4

27.3 parts of the chloride of 4-amino-benzene sulfonic acid N-methyl - N - β[N',N'-dimethyl-hydrazinio]-ethyl-amide are dissolved in a mixture of 170 parts of water and 35 parts of 30% hydrochloric acid and diazotized at 0° with 100 parts of normal sodium nitrile solution. The clear diazo solution is run in 15 minutes with good stirring into an ice-cold solution of 45 parts of crystallized sodium acetate in 250 parts of water, in which 21.9 parts of 1-(3'-chlorophenyl)-3-methyl-5-pyrazolone is suspended in an extremely fine state. Stirring is continued at 0° and in the course of 2 hours the pH value of the dyestuff suspension is increased to 6.0 by the addition of a sufficient amount of sodium carbonate. On completion of coupling the reaction mass is heated to 35° and the whole of the precipitated dyestuff is collected on a filter. On drying and grinding there is obtained a yellow powder which dissolves in water to give yellow solutions and is suitable for dyeing polyacrylonitrile fibers in very fast yellow shades.

EXAMPLE 5

The 21.9 parts of 1-(3'-chlorophenyl)-3-methyl-5-pyrazolone used in the preceding Example 4 are replaced by 18.3 parts of 1-phenyl-3-methyl-5-pyrazolone and the procedure described in that example is performed. The product is a similar dyestuff which is also suitable for dyeing polyacrylonitrile fibers in very fast yellow shades.

EXAMPLE 6

27.3 parts of the chloride of 4-amino-benzene sulfonic acid N-methyl - N - β[N',N'-dimethylhydrazinio]-ethyl-amide are dissolved in a mixture of 170 parts of water and 35 parts of 30% hydrochloric acid and diazotized at 0° with 100 parts of normal sodium nitrite solution. The diazo solution, which contains no excess nitrous acid, is neutralized by dropwise addition of 5% aqueous ammonia solution to the pH value of 7.5. At the same temperature a solution of 30 parts of 2,5-dimethoxy-4-chloroacetoacetic anilide in 200 parts of ethyl alcohol is dropped in at an even rate in the course of 30 minutes with good stirring. Stirring is continued at 0° until the coupling reaction is completed, after which the dyestuff is isolated in the usual way. The basic dyestuff is dried and ground to a yellow powder which dissolves in water with a yellow coloration and is suitable for dyeing polyacrylonitrile fibers in very fast bright shades.

EXAMPLE 7

The 27.3 parts of the chloride of 4-amino-benzene sulfonic acid N-methyl-N-β[N',N'-dimethyl-hydrazinio]-ethylamide used in Example 4 are replaced by 27.3 parts of the chloride of 4-amino-benzene sulfonic acid N-γ-[N',N'-dimethylhydrazinio]-propyl amide. The operating procedure is again as described in Example 4 and a similar dyestuff is obtained which dyes polyacrylonitrile fibers in fast yellow shades.

EXAMPLE 8

The 27.3 parts of the chloride of 4-amino-benzene sulfonic acid N-methyl-N-β[N',N'-dimethylhydrazinio]-ethylamide in Example 4 are replaced by 23.7 parts of the chloride of 4-amino-benzoic acid N-methyl-N-β[N',N'-dimethylhydrazinio]-ethyl amide. The operating procedure is again as described in Example 4 and a similar dyestuff is obtained which dyes polyacrylonitrile fibers in fast yellow shades.

Dyeing.—Example A 20 parts of the dye obtained according to Example 1 are intimately mixed with 80 parts of dextrin in a ball mill for 48 hours.

1 part of this preparation is pasted with 1 part of acetic acid 40%, 400 parts of distilled water at 60° are poured over the paste with constant agitation and the whole boiled for a short time. The solution is diluted with 7600 parts of distilled water, and 2 parts of glacial acetic acid are added. 100 parts of "Orlon" (registered trademark) are entered in this bath at 60°. The material was pretreated for 10–15 minutes at 60° in a bath of 8000 parts of water and 2 parts of glacial acetic acid. The dyebath is brought to 100° in 30 minutes, boiled for 1 hour and the material rinsed. A level yellow dyeing of excellent light fastness and very good wet fastness is obtained.

Pad dyeing.—Example B

A padding liquor is prepared with:

| | Grams per liter |
|---|---|
| Dye (corresponding to the dyeing preparation produced in the previous dyeing example) | 50 |
| Sodium alginate | 3 |
| Acetic acid conc. | 5 |
| Cationic softener e.g. a condensation product of 1 mol stearic acid and 1 mol triethanolamine | 20 |

Polyacrylonitrile fiber material is padded cold by the usual method on a 2 or 3 bowl pad. The pick-up is 80%. After intermediate drying for a short time at 90° on tenters, in a hot flue or by infrared radiation, the material is fixed for 1–3 minutes with dry air at 170–190° on tenters, subsequently rinsed, soaped and rinsed again. A yellow dyeing with excellent light fastness is obtained.

Textile printing.—Example C

A printing paste is made up with:

| | Parts |
|---|---|
| Dye (corresponding to the dyeing preparation produced in the previous dyeing example) | 75 |
| Acetic acid conc. | 10 |
| Sodium alginate thickening | 450 |

A cationic softener, e.g. a condensation product of
1 mol stearic acid and 1 mol triethanolamine --- 25
Glauber's salt ------------------------------- 25
Water --------------------------------------- 415
                                              ————
                                              1000

Polyacrylonitrile fiber material is printed according to the usual hand-block printing process and subsequently air-dried, steamed for 20–30 minutes in a star steamer with saturated steam, rinsed, soaped, rinsed again and dried. On polyacrylonitrile fabrics a yellow print with very good fastness properties is obtained.

In the following Tables 1, 2, 3 and 4 the symbols $K_1$, $K_2$ and $K_3$ represent the following groupings:

$K_1$ the grouping:

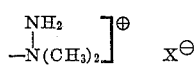

$K_2$ the grouping:

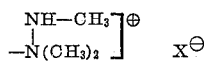

$K_3$ the grouping:

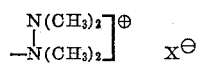

The symbols $K_1$, $K_2$, $K_3$ and the anion $X^\ominus$ in the individually presented dyes are chosen from the series displayed above or in the specification respectively. These groupings or anions can be exchanged in any of these dyes for another grouping or another anion in the series. Thus, the symbols $K_2$ or $K_3$ may appear in place of $K_1$. It may therefore be noted as fundamental that in these dyes the symbol K with a given number may in each instance be exchanged for any other symbol K having a number different from it.

Further valuable basic dyestuffs, which can be produced by the procedures given in the above Examples 1 to 8 are described in the following Table 1.

They correspond to the formula

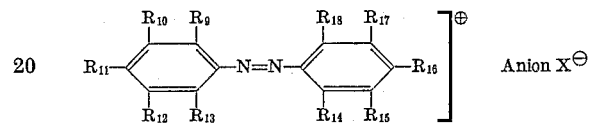

wherein the symbols $R_9$–$R_{18}$ have the meanings assigned them in the said table.

The anion $X^\ominus$ may be anyone of those named in the specification.

TABLE 1

| Ex. | $R_9$ | $R_{10}$ | $R_{11}$ | $R_{12}$ | $R_{13}$ | $R_{14}$ |
|---|---|---|---|---|---|---|
| 9 | $OC_2H_5$ | H | CN | H | H | $\underset{CH_3}{N}-CO-CH_2-K_1$ with CH$_3$ |
| 10 | Cl | H | $NO_2$ | H | H | $\underset{CH_3}{N}-CO-CH_2K_1$ with CH$_3$ |
| 11 | $\underset{CH_3}{N}-CO-CH_2-K_2$ | H | $NO_2$ | H | CN | $CH_3$ |
| 12 | $\underset{C_2H_5}{N}-CO-CH_2-K_1$ | H | $NO_2$ | H | H | H |
| 13 | $SO_2-N\!\!<\!\!\begin{smallmatrix}C_2H_5\\C_2H_4-K_1\end{smallmatrix}$ | H | $NO_2$ | H | H | H |
| 14 | $SO_2-N\!\!<\!\!\begin{smallmatrix}CH_3\\C_2H_4-K_1\end{smallmatrix}$ | H | $NO_2$ | H | H | Cl |
| 15 | CN | H | $K_1C_3H_6-NH-SO_2-$ | H | H | H |
| 16 | $NO_2$ | H | $K_1C_3H_6-NH-SO_2-$ | H | H | H |
| 17 | $CH_3-SO_2-$ | H | $K_1C_3H_6-NH-SO_2-$ | H | H | H |
| 18 | CN | H | $K_1C_3H_6-NH-SO_2-$ | H | H | H |
| 19 | $CF_3$ | H | $K_1C_3H_6-NH-SO_2-$ | H | H | H |
| 20 | Cl | H | $K_1C_3H_6-NH-SO_2-$ | H | H | H |
| 21 | Cl | H | $K_1C_3H_6-NH-SO_2-$ | H | H | H |
| 22 | Cl | H | $K_1C_3H_6-NH-SO_2-$ | H | H | H |
| 23 | Cl | H | $K_1C_3H_6-NH-SO_2-$ | H | H | H |
| 24 | Cl | H | $K_1C_3H_6-NH-SO_2-$ | H | H | H |
| 25 | Cl | H | $K_1C_3H_6-NH-SO_2-$ | H | H | H |
| 26 | Br | H | $K_1C_3H_6-NH-SO_2-$ | H | H | H |
| 27 | $CF_3$ | H | $K_1C_3H_6-NH-SO_2-$ | H | H | H |
| 28 | $CO-N\!\!<\!\!\begin{smallmatrix}C_2H_5\\C_2H_4-K_3\end{smallmatrix}$ | H | $NO_2$ | H | Cl | $CH_3$ |
| 29 | $CO-N\!\!<\!\!\begin{smallmatrix}CH_3\\C_2H_4-K_1\end{smallmatrix}$ | H | $NO_2$ | H | H | H |

TABLE 1—Continued

| Ex. | R₉ | R₁₀ | R₁₁ | R₁₂ | R₁₃ | R₁₄ |
|---|---|---|---|---|---|---|
| 30 | N(CH₃)(SO₂—C₂H₄—K₁) | H | NO₂ | H | H | Cl |
| 31 | N(C₂H₅)(SO₂—C₂H₄—K₁) | H | NO₂ | H | H | Cl |
| 32 | NHSO₂—C₂H₄—K₁ | H | NO₂ | H | H | NO₂ |
| 33 | Cl | H | NO₂ | H | H | H |
| 34 | H | H | SO₂—N(CH₃)—C₂H₄—K₁ | H | H | H |
| 35 | Cl | H | NO₂ | H | H | H |
| 36 | SO₂N(CH₃)—C₂H₄K₁ | H | NO₂ | H | H | H |
| 37 | H | H | R₁C₂H₄N(CH₃)—CO— | H | H | OH |

| Ex. | R₁₅ | R₁₆ | R₁₇ | R₁₈ | Shade of the dyeing on polyacrylonitrile | Anion X⁻ |
|---|---|---|---|---|---|---|
| 9 | H | N(C₃H₇)₂ | H | H | Orange | Cl |
| 10 | H | N(C₂H₅)₂ | H | H | Bordeaux | Cl |
| 11 | H | N(C₂H₅)₂ | H | H | Violet | Br |
| 12 | H | N(C₂H₄CN)(C₂H₅) | H | H | Scarlet | CH₃SO₄ |
| 13 | Cl | N(C₂H₄CN)(CH₃) | H | H | Red | Cl |
| 14 | H | N(CH₃)₂ | H | H | Red | Cl |
| 15 | H | N(C₂H₄CN)(C₂H₅) | H | H | Red | Cl |
| 16 | H | N(C₂H₄CN)(C₂H₅) | H | H | Ruby | Cl |
| 17 | H | N(C₂H₄CN)(C₂H₅) | H | H | Red | CH₃SO₄ |
| 18 | H | N(C₂H₄CN)(C₂H₅) | H | CH₃ | Ruby | Cl |
| 19 | H | N(C₂H₄CN)(C₂H₅) | H | CH₃ | do | Cl |
| 20 | H | N(C₂H₄OH)(C₂H₅) | H | CH₃ | Red-orange | Br |
| 21 | H | N(C₄H₉)(C₂H₅) | H | CH₃ | do | Cl |
| 22 | H | N(C₂H₄OH)₂ | H | CH₃ | do | Cl |
| 23 | H | N(C₂H₄—OOCCH₃)₂ | H | CH₃ | do | CH₃SO₄ |
| 24 | H | N(C₂H₄—OH)(C₂H₅) | H | CH₃ | do | CH₃SO₄ |

TABLE 1—Continued

| Ex. | $R_{15}$ | $R_{16}$ | $R_{17}$ | $R_{18}$ | Shade of the dyeing on polyacrylonitrile | Anion $X^{\ominus}$ |
|---|---|---|---|---|---|---|
| 25 | H | $N(C_2H_4-OH)(C_2H_5)$ | H | H | Red-orange | $HSO_4$ |
| 26 | H | $N(C_2H_4-CN)(C_2H_5)$ | H | H | do | $CH_3SO_4$ |
| 27 | H | $N(C_2H_4-CN)(C_2H_5)$ | H | H | Red | Cl |
| 28 | H | $N(C_2H_4OH)_2$ | H | H | Brown | Cl |
| 29 | H | $N(C_2H_5)_2$ | H | H | Orange | Cl |
| 30 | H | $N(C_2H_5)_2$ | H | H | Bordeaux | Cl |
| 31 | H | $N(C_2H_5)_2$ | H | H | do | Cl |
| 32 | H | $N(CH_3)_2$ | H | H | Ruby | Cl |
| 33 | H | $N((CH_2)_4-K_1)(C_2H_5)$ | H | H | Red | $CH_3SO_4$ |
| 34 | $CH_3$ | H | H | OH | Yellow | Cl |
| 35 | H | $N(C_2H_4-O-C_2H_4-K_1)(C_2H_5)$ | H | H | Red | Cl |
| 36 | H | $N(C_2H_4CN)(C_2H_5)$ | H | H | Red | Cl |
| 37 | H | H | $CH_3$ | H | Yellow | Cl |

Further valuable basic dyestuff, which can be produced by the procedures given in the above Examples 1 to 8 are described in the following Table 2.

They correspond to the formula

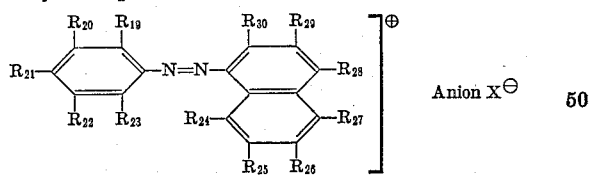

wherein the symbols $R_{19}$–$R_{30}$ have the meanings assigned them in said table.

The anion $X^{\ominus}$ may be anyone of those named in the specification.

TABLE 2

| Ex. | $R_{19}$ | $R_{20}$ | $R_{21}$ | $R_{22}$ | $R_{23}$ | $R_{24}$ | $R_{25}$ |
|---|---|---|---|---|---|---|---|
| 38 | H | $SO_2NH(CH_2)_3-K_1$ | H | H | H | H | H |
| 39 | $CO-N(C_2H_5)(C_2H_4-K_1)$ | H | $NO_2$ | H | H | H | H |
| 40 | $SO_2-N(CH_3)(C_2H_4-K_1)$ | H | $NO_2$ | H | H | H | H |
| 41 | $SO_2-N(CH_3)-C_2H_4-K_1$ | H | $NO_2$ | H | H | H | H |
| 42 | $SO_2-N(CH_3)-C_2H_4-K_1$ | H | $NO_2$ | H | H | H | H |
| 43 | $SO_2-N(C_2H_5)-C_2H_4-K_1$ | H | $NO_2$ | H | H | H | H |

TABLE 2—Continued

| Ex. | R_19 | R_20 | R_21 | R_22 | R_23 | R_24 | R_25 |
|---|---|---|---|---|---|---|---|
| 44 | Cl | H | NO_2 | H | H | H | H |
| 45 | Br | H | NO_2 | H | NO_2 | H | H |
| 46 | SO_2—N(CH_3)—C_2H_4—K_1 | H | NO_2 | H | H | H | H |
| 47 | H | H | SO_2—N(CH_3)—C_2H_4—K_1 | H | H | H | H |
| 48 | H | H | SO_2—N(CH_3)—C_2H_4—K_2 | H | H | H | H |
| 49 | H | H | SO_2—N(CH_3)—C_2H_4—K_3 | H | H | H | H |
| 50 | H | H | SO_2—N(CH_3)—C_2H_4—K_1 | H | H | H | H |
| 51 | H | H | SO_2—N(CH_3)—C_2H_4—K_2 | H | H | H | H |
| 52 | H | H | SO_2—N(CH_3)—C_2H_4—K_2 | H | H | H | H |
| 53 | H | H | SO_2—N(CH_3)—C_2H_4—K_2 | H | H | H | H |
| 54 | H | H | SO_2—N(CH_3)—C_2H_4—K_2 | H | H | H | H |
| 55 | H | H | SO_2—N(CH_3)—C_2H_4—K_2 | H | H | H | H |
| 56 | H | H | SO_2—N(CH_3)—C_2H_4—K_2 | H | H | H | H |

| Ex. | R_26 | R_27 | R_28 | R_29 | R_30 | Shade of the dyeing on Polyacrylonitrile | Anion X$^{\ominus}$ |
|---|---|---|---|---|---|---|---|
| 38 | H | H | H | H | OH | Orange | Cl |
| 39 | H | H | H | H | NHCH_3 | Violet | Cl |
| 40 | H | H | H | H | NH—(2,6-di-CH_3-cyclohexyl) | Blue-violet | Cl |
| 41 | H | H | H | H | OH | Orange | CH_3SO_4 |
| 42 | H | H | H | H | NHCH_3 | Violet | Cl |
| 43 | H | H | H | H | NH—(2,4,6-tri-CH_3-cyclohexyl) | ...do... | Cl |
| 44 | SO_2N(CH_3)—C_2H_4—K_1 | H | H | H | NH—CH_3 | Red | Cl |
| 45 | SO_2N(C_2H_5)—C_2H_4—K_1 | H | H | H | NH_2 | Violet | HSO_4 |
| 46 | H | H | H | H | NH—C_6H_5 | Blue | CH_3SO_4 |
| 47 | H | H | H | H | OH | Orange | I |
| 48 | H | H | H | H | OH | ...do... | ClO_4 |
| 49 | H | H | H | H | OH | ...do... | HOOC—COO |
| 50 | H | H | H | H | OH | ...do... | CH_3COO |
| 51 | H | H | H | H | OH | ...do... | C_2H_5COO |
| 52 | H | H | H | H | OH | ...do... | HOOC—HC=CH—COO |
| 53 | H | H | H | H | OH | ...do... | ClCH_2COO |

TABLE 2—Continued

| Ex. | $R_{26}$ | $R_{27}$ | $R_{28}$ | $R_{29}$ | $R_{30}$ | Shade of the dyeing on Polyacrylonitrile | Anion $X^\ominus$ |
|---|---|---|---|---|---|---|---|
| 54 | H | H | H | H | OH | Orange |  |
| 55 | H | H | H | H | OH | ____do____ |  |
| 56 | H | H | H | H | OH | ____do____ | Br |

The base of the hydrazinium grouping need not necessarily be a coupling or a diazo component of the benzene or naphthalene series as in the above examples, but can also be a heterocyclic coupling componud or a diazo component.

Further valuable basic dyestuff of this series, which can also be produced by the procedures given in the above Examples 1 to 8 are described in the following table. They correspond to the formula

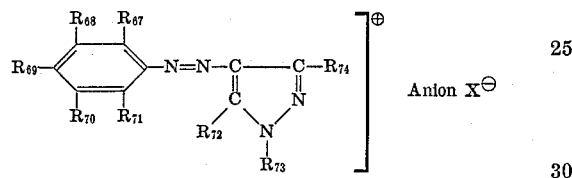

wherein the symbols $R_{67}$–$R_{74}$ have the meanings assigned them in said table.

The anion $X^\ominus$ may be of those named in the specification.

TABLE 3

| Ex. | $R_{67}$ | $R_{68}$ | $R_{69}$ | $R_{70}$ | $R_{71}$ |
|---|---|---|---|---|---|
| 57 | $OCH_3$ | $SO_2-NH-C_3H_6-K_1$ | H | H | H |
| 58 | $CH_3$ | H | $CH_3$ | $CH_2NHCOCH_2-K_1$ | $CH_3$ |
| 59 | $CH_3$ | H | $CH_3$ | $CH_2NHCOCH_2-K_1$ | $CH_3$ |
| 60 | $CH_3$ | H | $CH_3$ | $CH_2NHCOCH_2-K_1$ | $CH_3$ |
| 61 | $CH_3$ | H | $CH_3$ | $CH_2NHCOCH_2-K_1$ | $CH_3$ |
| 62 | $CH_3$ | H | $CH_3$ | $CH_2NHCOCH_2-K_1$ | $CH_3$ |
| 63 | $CH_3$ | H | $CH_3$ | $CH_2NHCOCH_2-K_1$ | $CH_3$ |
| 64 | $CH_3$ | H | $CH_3$ | $CH_2NHCOCH_2-K_1$ | $CH_3$ |
| 65 | $CH_3$ | H | $CH_3$ | $CH_2NHCOCH_2-K_1$ | $CH_3$ |
| 66 | $CH_3$ | H | $CH_3$ | $CH_2NHCOCH_2-K_1$ | $CH_3$ |
| 67 | $CH_3$ | H | $CH_3$ | $CH_2NHCOCH_2-K_1$ | $CH_3$ |
| 68 | $OCH_3$ | H | $CH_2NHCOCH_2-K_1$ | $CH_3$ | H |
| 69 | $OCH_3$ | H | $CH_2NHCOCH_2-K_1$ | $CH_3$ | H |
| 70 | $OCH_3$ | H | $CH_2NHCOCH_2-K_1$ | $CH_3$ | H |
| 71 | $OCH_3$ | H | $CH_2NHCOCH_2-K_1$ | $CH_3$ | H |
| 72 | $OCH_3$ | H | $CH_3$ | $CH_2NHCOCH_2-K_1$ | H |
| 73 | $OCH_3$ | H | $CH_2NHCOCH_2-K_1$ | $OCH_3$ | H |
| 74 | H | $NO_2$ | $CH_3$ | $CH_2NHCOCH_2-K_1$ | $OCH_3$ |
| 75 | Cl | H | H | H | H |
| 76 | H | H | $NHCOCH_3$ | H | H |
| 77 | H | H | $NHCOC_2H_5$ | H | H |
| 78 | H | H | $COOC_2H_5$ | H | H |

| Ex. | $R_{72}$ | $R_{73}$ | $R_{74}$ | Shade of the dying on Polyacrylonitrile | Anion $X\%$ |
|---|---|---|---|---|---|
| 57 | OH |  | $CH_3$ | Yellow | Cl |
| 58 | OH | H | $CH_3$ | ____do____ | Cl |
| 59 | OH | H | $CO-NH_2$ | ____do____ | Cl |

TABLE 3—Continued

| Ex. | R₇₂ | R₇₃ | R₇₄ | Shade of the dying on Polyacrylonitrile | Anion X⊖ |
|---|---|---|---|---|---|
| 60 | OH | CH₃ | CH₃ | Yellow | CH₃SO₄ |
| 61 | OH | C₂H₄CN | CH₃ | ...do... | CH₃SO₄ |
| 62 | OH | C₂H₄OH | CH₃ | ...do... | Cl |
| 63 | OH | ⬡ | CH₃ | ...do... | Cl |
| 64 | OH | ⬡-Cl | CH₃ | ...do... | Cl |
| 65 | OH | ⬡-NO₂ | CH₃ | Reddish-yellow | Cl |
| 66 | OH | ⬡-NH-CO-CH₃ | CH₃ | ...do... | Cl |
| 67 | OH | ⬡-NH₂ | CH₃ | ...do... | Cl |
| 68 | OH | SO₂-CH₃ | CH₃ | Greenish-yellow | Cl |
| 69 | OH | SO₂-N(CH₃)₂ | CH₃ | ...do... | Cl |
| 70 | OH | SO₂-⬡-CH₃ | CH₃ | ...do... | Cl |
| 71 | NH₂ | ⬡-Cl | CH₃ | ...do... | Cl |
| 72 | OH | ⬡ | COOCH₃ | Yellow | Cl |
| 73 | OH | Cl-⬡ | CH₃ | Reddish-yellow | Cl |
| 74 | NH₂ | CH₂-CHOH-⬡ | CH₃ | Orange | CH₃SO₄ |
| 75 | OH | ⬡(CH₃)(CH₃)(CH₂NHCOCH₂-K₁) | CH₃ | Yellow | CH₃SO₄ |
| 76 | OH | ⬡(CH₃)(CH₃)(CH₂NHCOCH₂-K₁) | CH₃ | ...do... | Cl |
| 77 | OH | ⬡(CH₃)(CH₃)(CH₂NHCOCH₂-K₁) | CH₃ | ...do... | Cl |
| 78 | OH | ⬡(CH₃)(CH₃)(CH₂NHCOCH₂-K₁) | CH₃ | ...do... | Cl |

Further valuable basic dyes, which can be produced by the procedures given in the above Examples 1 to 8 are described in the following Table 4.

They correspond to the formula

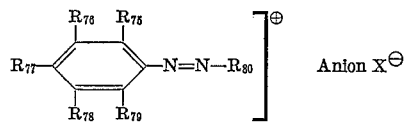

wherein the symbols $R_{75}$–$R_{80}$ have the meanings assigned them in said table.

The anion $X^{\ominus}$ may be anyone of those named in the specification.

TABLE 4

| Ex. | R75 | R76 | R77 | R78 | R79 | R80 | Shade of the dyeing on Polyacrylonitrile | Anion X⊖ |
|---|---|---|---|---|---|---|---|---|
| 79 | CH₃ | H | CH₃ | CH₂NHCOCH₃—K₁ | CH₃ | 4-hydroxy-1-methylcyclohexyl | Yellow | Cl |
| 80 | CH₃ | H | CH₃ | CH₂NHCOCH₃—K₁ | CH₃ | 4-hydroxy-1-tert-butylcyclohexyl | do | CH₃SO₄ |
| 81 | OCH₃ | H | CH₂NHCOCH₃—K₁ | CH₃ | H | 2-(N-cyanoethyl-N-acetyl-amino)phenyl (—N(C₂H₄CN)COCH₃) | Orange | HSO₄ |
| 82 | OCH₃ | H | CH₂NHCOCH₃—K₁ | CH₃ | H | 2-(acetylamino)phenyl (—NHCOCH₃) | Yellow | Cl |
| 83 | OCH₃ | H | CH₂NHCOCH₃—K₁ | CH₃ | H | 2-(cyclohexylcarbonylamino)phenyl | Orange | CH₃SO₄ |
| 84 | OCH₃ | H | CH₂NHCOCH₃—K₁ | CH₃ | H | 2-acetylamino-6-chlorophenyl | Yellow | CH₃SO₄ |
| 85 | OCH₃ | H | CH₂NHCOCH₃—K₁ | CH₃ | H | 2-(N-methyl-acetylamino)phenyl (—N(CH₃)COCH₃) | Reddish-yellow | Cl |

| | | | | | | | |
|---|---|---|---|---|---|---|---|
| 86 | OCH₃ | H | CH₂NHCOCH₂—K₁ | CH₃ | H | ![structure] | Yellow | Cl |
| 87 | CH₃ | H | CH₃ | CH₂NHCOCH₂—K₁ | H | ![structure] | do | CH₃SO₄ |
| 88 | H | H | CH₃—SO₂NC₂H₄—K₁ | H | H | ![structure] | do | Cl |
| 89 | OCH₃ | H | CH₃ | CH₂NHCOCH₂—K₁ | H | NC—CH—CO— | do | Cl |
| 90 | OCH₃ | H | CH₃ | CH₂NHCOCH₂—K₁ | OCH₃ | NC—CH—SO₂— | do | Cl |
| 91 | OCH₃ | H | CH₂NHCOCH₂—K₁ | H | OCH₃ | ![naphthyl-NH₂] | Red | Cl |
| 92 | OCH₃ | H | CH₂NHCOCH₂—K₁ | H | H | ![naphthyl with SO₂N(CH₃)₂] | Red | Cl |
| 93 | Br | H | NO₂ | H | NO₂ | ![naphthyl with NH-tolyl, SO₂-N-C₂H₄-K₁, CH₃] | Blue | Cl |

TABLE 4—Continued

| Ex. | $R_{75}$ | $R_{76}$ | $R_{77}$ | $R_{78}$ | $R_{79}$ | $R_{80}$ | Shade of the dyeing on Polyacrylonitrile | Anion $X^{\ominus}$ |
|---|---|---|---|---|---|---|---|---|
| 94 | $OCH_3$ | H | $CH_2NHCOCH_3-K_1$ | Cl | H | $H_3C-CO-CH-CO-NH-$⟨benzene with $OCH_3$, $OCH_3$⟩ | Yellow | Cl |
| 95 | $OCH_3$ | H | $CH_2NHCOCH_3-K_1$ | Cl | H | $H_3C-CO-CH-CO-NH-$⟨benzene with Cl, $OCH_3$, $OCH_3$⟩ | do | Cl |
| 96 | $OCH_3$ | H | $CH_2-NHCOCH_3-K_1$ | Cl | H | ⟨benzene with $H_3C$-, $C(=O)CH_3$, NH-⟩ | Reddish-yellow | $CH_3SO_4$ |
| 97 | H | H | $NHCOOC_2H_5$ | $CH_2NHCOCH_2-K_1$ | H | $H_3C-CO-CH-CO-NH(CH_2)_3-CH_3$ | Yellow | $CH_3SO_4$ |
| 98 | H | H | $NHCOOC_2H_5$ | $CH_2NHCOCH_2-K_1$ | H | $H_3C-CO-CH-CO-NH-CH_2-$⟨phenyl⟩ | do | Cl |
| 99 | H | H | $NHCOOC_2H_5$ | $CH_2NHCOCH_2-K_1$ | H | ⟨benzene with $CH_2-CH_2$, $NH-CH_2$⟩ | Red | Cl |
| 100 | H | H | $NHCOOC_2H_5$ | $CH_2NHCOCH_2-K_1$ | H | ⟨benzene with $CH_2-CH_2$, $N-CH_2$, $C_2H_4-CN$⟩ | Red | Cl |
| 101 | H | H | $NHCOOC_2H_5$ | $CH_2NHCOCH_2-K_1$ | H | $H_3C-CO-CH-CO-$⟨cyclohexyl⟩ | Yellow | $CH_3SO_4$ |
| 102 | H | H | $NHCOOC_2H_5$ | $CH_2NHCOCH_2-K_1$ | H | $H_3C-CO-CH-SO_2-CH_3$ | do | Cl |
| 103 | H | H | $NHCOOC_2H_5$ | $CH_2NHCOCH_2-K_1$ | H | ⟨benzodioxole CH-CO-O, O⟩ | do | Cl |
| 104 | H | $NO_2$ | $CH_3$ | $CH_2NHCOCH_3-K_1$ | $OCH_3$ | $H_3C-CO-CH-CO-CH_3$ | do | Cl |

| | | | | | | | Color | Anion |
|---|---|---|---|---|---|---|---|---|
| 105 | H | NO$_2$ | CH$_3$ | | CH$_2$NHCOCH$_3$—K$_1$ | OCH$_3$ | (structure) | do | Cl |
| 106 | H | NO$_2$ | CH$_3$ | | CH$_2$NHCOCH$_3$—K$_1$ | OCH$_3$ | (structure) | do | Cl |
| 107 | H | NO$_2$ | CH$_3$ | | CH$_2$NHCOCH$_3$—K$_1$ | OCH$_3$ | (structure) | do | Cl |
| 108 | Cl | H | NO$_2$ | | H | H | (structure) | Red | Cl |
| 109 | H | NO$_2$ | CH$_3$ | | CH$_2$NHCOCH$_3$—K$_1$ | OCH$_3$ | (structure) | Yellow | Cl |
| 110 | OCH$_3$ | H | H | | CH$_3$—K$_1$ | H | (structure) | do | CH$_3$SO$_4$ |
| 111 | OCH$_3$ | H | CH$_3$ | | CH$_3$—K$_1$ | H | (structure) | do | HSO$_4$ |
| 112 | H | H | NHCOCH$_3$—K$_1$ | | H | H | (structure) | do | CH$_3$SO$_4$ |
| 113 | H | H | CONH—(structure)—CH$_2$NHCOCH$_3$—K$_1$ | | H | H | (structure) | Orange | Cl |

TABLE 4—Continued

| Ex. | $R_{75}$ | $R_{76}$ | $R_{77}$ | $R_{78}$ | $R_{79}$ | $R_{80}$ | Shade of the dyeing on Polyacrylonitrile | Anion $X^\ominus$ |
|---|---|---|---|---|---|---|---|---|
| 114 | $SO_2-N\begin{smallmatrix}CH_3\\C_2H_4-K_1\end{smallmatrix}$ | H | $NO_2$ | H | H | (structure with $CH_3$, $C_2H_5$, N-H) | Violet | Cl |
| 115 | $SO_2-N\begin{smallmatrix}CH_3\\C_2H_4-K_1\end{smallmatrix}$ | H | $NO_2$ | H | H | (structure with $CH_3$, N-H, NHCOCH$_3$) | do | Cl |
| 116 | $SO_2-N\begin{smallmatrix}C_2H_5\\C_2H_4-K_1\end{smallmatrix}$ | H | $NO_2$ | H | H | (structure with N-H, OH, HO) | Blue | Cl |
| 117 | $N\begin{smallmatrix}CH_3\\COCH_3-K_1\end{smallmatrix}$ | H | $NO_2$ | H | CN | (structure with $CH_3$, N-H, $CH_3$) | do | Cl |
| 118 | Cl | H | $SO_2-N\begin{smallmatrix}C_2H_5\\C_2H_4-K_1\end{smallmatrix}$ | H | H | (structure with $CH_3$, N-H, $CH_3$) | Violet | Cl |
| 119 | H | H | $SO_2N\begin{smallmatrix}CH_3\\C_2H_4-K_1\end{smallmatrix}$ | H | H | (structure -N=N- with OCH$_3$, OH) | Yellow | Cl |
| 120 | H | H | $SO_2N\begin{smallmatrix}C_2H_5\\C_2H_4-K_1\end{smallmatrix}$ | H | H | (structure -N=N- with CH$_3$, OH) | Orange | Cl |

Formulae of representative dyes of the foregoing examples are as follows:

EXAMPLE 36

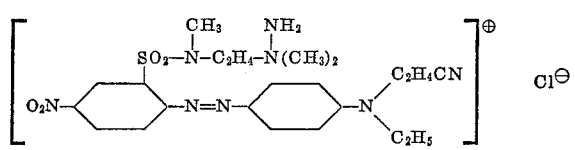

EXAMPLE 37

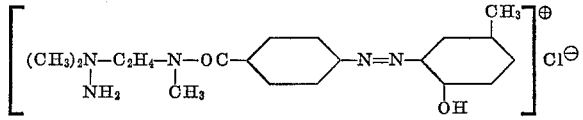

EXAMPLE 40

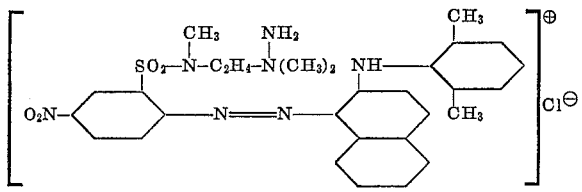

EXAMPLE 44

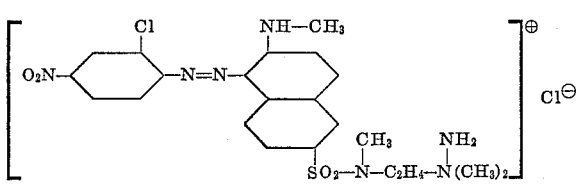

EXAMPLE 88

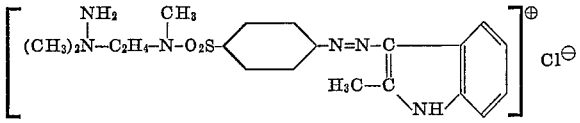

Having thus disclosed the invention what we claim is:
1. A basic dyestuff of the formula

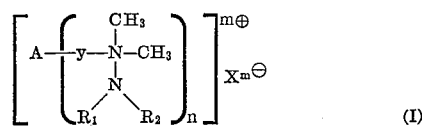

wherein
A is a member selected from the group consisting of a radical of a monoazo and a disazo dyestuff, said dyestuffs being free from carboxylic acid and sulfonic acid groups,
y is a bridge member connected an an aryl nucleus of A and is selected from the group consisting of

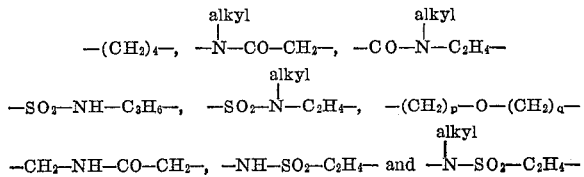

wherein
p and q each stands for a positive integer of up to 6 and alkyl being lower alkyl in each occurrence thereof,
$R_1$ and $R_2$ each is a member selected from the group consisting of hydrogen and methyl,
n is a positive integer of up to 2,
m is a positive integer of up to 2, and when n is 2, m is 2,
and
$X^\ominus$ is an anion.

2. A basic dye according to claim 1, said basic dye being of the formula

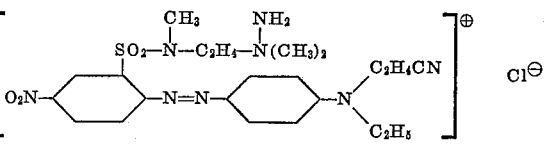

3. A basic dye according to claim 1, said basic dye being of the formula

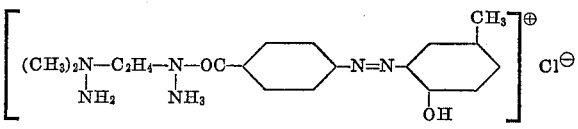

4. A basic dye according to claim 1, said basic dye being of the formula

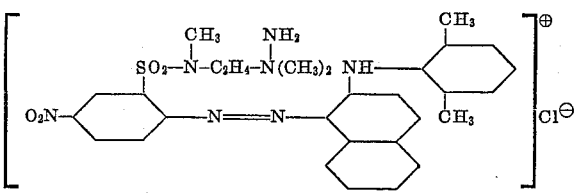

5. A basic dye according to claim 1, said basic dye being of the formula

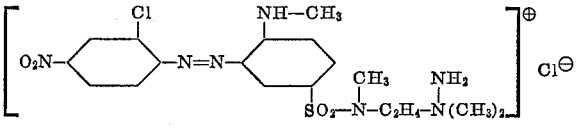

6. A basic dye according to claim 1, said basic dye being of the formula

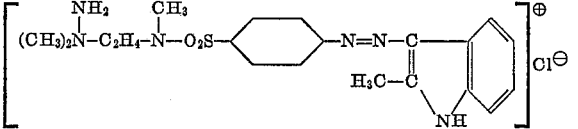

References Cited

UNITED STATES PATENTS

| | | | |
|---|---|---|---|
| 2,357,317 | 9/1944 | Dickey | 260—205 |
| 2,955,108 | 10/1960 | Omietanski | 260—205 |
| 3,183,224 | 5/1965 | Benz et al. | 260—146 |
| 3,190,871 | 6/1965 | Auerbach et al. | 260—146 |
| 3,206,451 | 9/1965 | Benz et al. | 260—153 |

CHARLES B. PARKER, *Primary Examiner.*

FLOYD D. HIGEL, *Assistant Examiner.*